US006861976B2

(12) United States Patent
Budic (10) Patent No.: US 6,861,976 B2
(45) Date of Patent: Mar. 1, 2005

(54) SYSTEM AND METHOD FOR ADAPTIVE BROADCAST RADAR SYSTEM

(75) Inventor: Robert D. Budic, Washington, DC (US)

(73) Assignee: Lockheed Martin Corporation, Bethesda, MD (US)

( * ) Notice: Subject to any disclaimer, the term of this patent is extended or adjusted under 35 U.S.C. 154(b) by 91 days.

(21) Appl. No.: 09/994,921

(22) Filed: Nov. 28, 2001

(65) Prior Publication Data

US 2003/0218565 A1 Nov. 27, 2003

Related U.S. Application Data

(60) Provisional application No. 60/253,095, filed on Nov. 28, 2000.

(51) Int. Cl.$^7$ ............................................... G01S 13/72
(52) U.S. Cl. ...................................................... 342/195
(58) Field of Search .................................. 342/159, 195

(56) References Cited

U.S. PATENT DOCUMENTS

| 4,683,474 A | | 7/1987 | Randig ........................ 342/368 |
| 5,534,868 A | * | 7/1996 | Gjessing et al. ............... 342/26 |
| 5,793,798 A | | 8/1998 | Rudish et al. ............... 375/206 |
| 5,805,107 A | | 9/1998 | Schroth et al. |
| 5,912,640 A | | 6/1999 | Bradford et al. ............ 425/342 |
| 2002/0005803 A1 | * | 1/2002 | Baugh et al. ................ 342/453 |
| 2002/0053982 A1 | * | 5/2002 | Baugh et al. ................ 340/945 |

FOREIGN PATENT DOCUMENTS

| EP | 0 893 703 A1 | 1/1999 |
| FR | 2719382 | 5/1994 |
| FR | 2776438 | 4/1996 |
| GB | 2 242 328 A | 9/1991 |
| GB | 2 251 351 A | 1/1992 |

OTHER PUBLICATIONS

International Search Report dated May 28, 2003, for Application No. PCT/US01/44267.
PCT Invitation to Pay Additional Fees / Annex Form PCT/ISA/206–Communication relating to the results of the partial International Search, PCT/US01/44267, Feb. 24, 2003.
Wu Jianqui, et al., Researches of a New Kind of Advanced Metric Wave Radar, East of China Research Institode of Electronic Engineering, pp 194–197, 1999.

* cited by examiner

Primary Examiner—Ian J. Lobo
(74) Attorney, Agent, or Firm—Marsh Fischmann & Breyfogle LLP (57) ABSTRACT

An adaptive broadcast radar system for tracking targets is disclosed. The radar system includes a transmitter having sub-apertures and a receiver having sub-apertures. The transmitter sub-apertures generate and code a signal waveform. The signal waveform is coded with data about the transmitter, including the degrees of freedom. The receiver receives signals comprising direct path signals and scattered signals correlating to the signal waveforms from the transmitter. The receiver includes a signal processor that regenerates a transmit beam for the coded data, delay, and doppler information from the received signals. The signal processor generates data quads encapsulating the information.

7 Claims, 8 Drawing Sheets

SYSTEM AND METHOD FOR ADAPTIVE BROADCAST RADAR SYSTEM

CROSS REFERENCE TO RELATED APPLICATIONS

This application claims benefit of U.S. Provisional Patent Application No. 60/253,095 entitled "Adaptive Broadcast Radar," filed Nov. 28, 2000, which is hereby incorporated by reference.

BACKGROUND OF THE INVENTION

1. Field of the Invention

The present invention relates to a radar system and method, and more particularly, to a system and method for performing adaptive broadcast radar operations.

2. Discussion of the Related Art

Radar systems may be represented by a bistatic or multistatic radar system. A multistatic radar system has many receivers that are separated from one or more transmitters. The radiated signal from a transmitter arrives at a receiver via two separate paths. One path may be a direct path from the transmitter to the receiver, and the other path may be a target path that includes an indirect path from the transmitter to a target to the receiver. Measurements may include a total path length, or transit time, of the target path signal, the angle of arrival of the target path signal, and the frequency of the direct and target path signals. A difference in frequency may be detected if the target is in motion according to a doppler effect.

Knowledge of the transmitted signal is desirable at the receiver if information is to be extracted from the target path signal. The transmitted frequency is desired to determine the doppler frequency shift. A time or phase reference also is desired if the total scattered path length is to be determined. The frequency reference may be obtained from the direct signal. The time reference also may be obtained from the direct signal provided the distance between the transmitter and the receiver is known.

Multistatic radar systems may be capable of determining the presence of a target within the coverage of the radar, the location of the target position, and a velocity component, or doppler, relative to the radar. The process of locating the target position may include a measurement of a distance and the angle of arrival. The measurement of distance relative to the receiving site may desire both the angle of arrival at the receiving site and the distance between transmitter and receiver. If the direct signal is available, it may be used as a reference signal to extract the doppler frequency shift.

Known radar systems may transmit a signal beam in a specific direction to search for targets. Once a target has been detected, the beam may be directed to follow the target. The receiver may receive scattered signals reflected off the target. By knowing the transmitter beam parameters, the receiver may perform operations to determine the target parameters, as disclosed above.

Future airborne radar systems may operate in a difficult environment where the detection of small and maneuverable targets may occur against a strong clutter background and jamming operations. Directed beams of energy from transmitters may be susceptible to jamming countermeasures and detection. Power aperture increases may not be effective to overcome these limitations and countermeasures against radar detection. Thus, future systems may desire increase sensitivity without increasing power requirements. This condition may be applicable especially to radar systems where the transmitter power is not controlled by the receiving party.

Mobile radar systems often operate in the presence of jamming interference and monostatic clutter that produced naturally by ground reflections. Difficulties may arise if both the transmitter and receiver are in motion, such as an airborne radar systems. When both the transmitter and receiver of a radar system are in motion, the rank of the clutter covariance may be increased. An increased number of degree of freedom in the receiver system may be needed to achieve a specified level of clutter suppression. Thus, a transmitter or receiver in motion may increase the clutter interference with a signal, or increase the complexity within the receiver in accounting for the increased degrees of freedom.

SUMMARY OF THE INVENTION

Accordingly, the present invention is directed to multistatic radar applications and signal processing. Thus, a system and method for adaptive broadcast radar operations is disclosed herein.

According to a disclosed embodiment, a method for formatting received data within an adaptive broadcast radar system having a transmitter comprising sub-apertures and a receiver comprising sub-apertures is disclosed. The data is received at the receiver. The method includes providing an estimate for a delay of scattered signal components within the received data. The method also includes generating an index for the estimate. The index may include a transmitter element number and a receiver element number. The method also includes generating a data quad for the index. The method also includes estimating a measurement covariance and a weight vector for the data quad. The data quad is reformatted with the measurement covariance and the weight vector.

According to another disclosed embodiment, a method for obtaining target parameters within an adaptive broadcast radar system is disclosed. The method includes coding information about a signal waveform generated by a transmitter having sub-apertures. The method also includes receiving a received signal at a receiver having sub-apertures corresponding to the sub-apertures of the transmitter. The signal correlates to the signal waveform. The method also includes decoding information about the signal waveform from the received signal. The method also includes determining a data quad from the information. The data quad may include degrees of freedom associated with the transmitter.

According to another disclosed embodiment, a method for generating a sensor signal for a received signal within an adaptive broadcast radar system is disclosed. The method includes defining a clutter component for the received signal at a receiver. The clutter component comprises a direct path signal and a scattered signal. The method also includes defining a channel transfer function. The method also includes generating a sampled version of the received signal according to the channel transfer function at a sample time. The method also includes determining a batch of data from the sampled version for a sub-aperture of the receiver at the sample time. The method also includes indexing the batch of data into the sensor signal model.

According to another embodiment, a method for transmitting a signal waveform from a transmitter within an adaptive broadcast radar system is disclosed. The transmitter comprises at least one sub-aperture. The method includes generating the signal waveform at the at least one sub-aperture. The method also includes coding the signal waveform at the at least one sub-aperture. The signal waveform is coded with the transmitter data. The method also includes phase shifting the signal waveform at the at least one sub-aperture. The method also includes transmitting the coded signal waveform from an array element coupled to the sub-aperture according to the phase shifting.

According to another embodiment, a method for performing radar operation within an adaptive broadcast radar system is disclosed. The radar system includes a transmitter having a first plurality of sub-apertures and a receiver having a second plurality of sub-apertures. The method includes encoding data on a signal waveform at a transmitter. The data includes a number for said sub-apertures of the transmitter and degrees of freedom for the transmitter. The method also includes continuously transmitting the signal waveform. The method also includes determining a delay value and a doppler value for received signals at said receiver. The received signals comprise direct and scattered signals of the signal waveform. The method also includes regenerating a transmit signal beam correlating to the signal waveform from the data, the delay value, and the doppler value.

According to another embodiment, an adaptive broadcast radar system is disclosed. The radar system includes a transmitter comprising a first plurality of sub-apertures. Each sub-aperture codes a signal waveform with data. The radar system also includes a receiver comprising a second plurality of sub-apertures coupled to a signal processor, wherein the signal processor generates a transmit beam signal according to the data within each signal waveform.

Additional features and advantages of the invention will be set forth in the description which follows, and in part will be apparent from the description, or maybe learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which is included to provide further understanding of the invention and are incorporated in and constitutes a part of this specification, illustrate embodiments of the present invention and together with the description serves to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
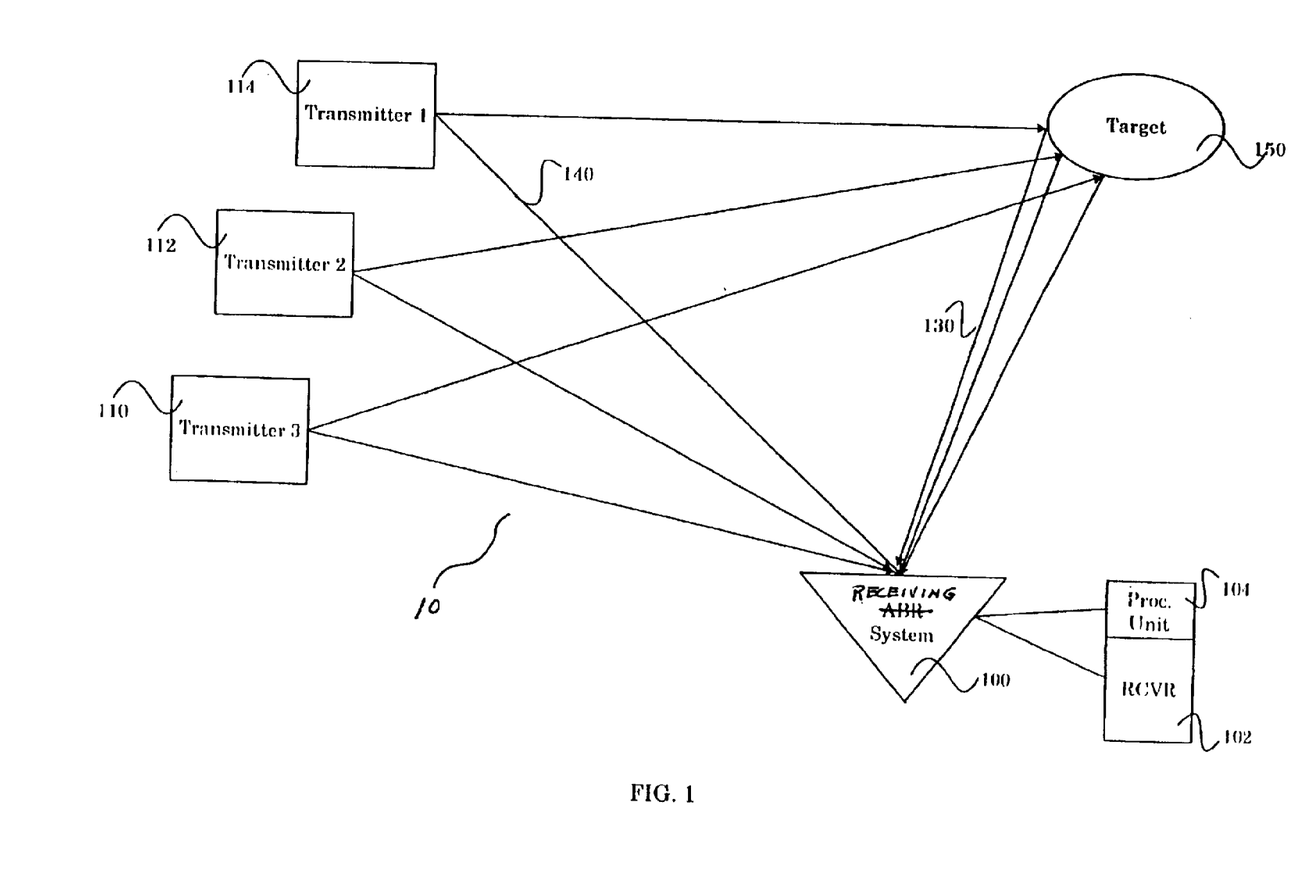
FIG. 1 illustrates a block diagram of an adaptive broadcast radar system for detecting and tracking a target in accordance with an embodiment of the present invention.

FIG. 1 depicts a block diagram of an adaptive broadcast radar system for detecting and tracking a target in accordance with an embodiment of the present invention. Radar detection system 10 includes a receiving system 100 to track one or more targets of interest 150 by exploiting signals from a plurality of transmitters 110, 112, and 114. Radar detection system 10 also may be known as an adaptive broadcast radar system.

Receiving system 100 represents a family of multi-static wide area target surveillance sensors. Receiving system 100 system exploit continuous wave ("CW") electromagnetic energy. Preferably, receiving system 100 may receive transmissions from a plurality of transmitters 110, 112, and 114. Preferred embodiments of the transmitters for use in an adaptive broadcast radar system are disclosed below in greater detail. Transmitters 110, 112, and 114, however, may include any device, system or means to transmit uncontrolled signals.

Transmitters 110, 112, and 114 may transmit wideband electromagnetic energy transmissions in all directions. Some of these transmissions are reflected by one or more targets of interest 150 and received by PCL system 100. For example, reflected transmission 130 may be reflected by target 150 and received by receiving system 100. Further, with regard to transmitter 114, reference transmission 140 may be received directly by receiving system 100. Receiving system 100 may compare reference transmission 140 and reflected transmission 130 to determine positional information about one or more targets of interest 150. Reference transmission 140 also may be known as a direct path signal. Reflected transmission 130 also may be known as a target path signal. Positional information may include any information relating to a position of target 150, including location, velocity, and acceleration from determining a time difference of arrival ("TDOA"), a frequency difference of arrival ("FDOA") and an angle of arrival ("AOA").

Receiving system 100 may comprise different components, including receiver 102 and processing unit 104. According to the disclosed embodiments, transmitter 110 may be a transmitter array, while receiver 102 may be a receiver array. Transmitter 110 may include a plurality of elements such that each element transmits an independent signal. The signals may comprise orthogonal or pseudo-orthogonal signals. Each of the plurality of elements for the transmitter and the receiver may comprise a dipole with a back-plane. Transmitter 110 may be in motion, and not at a fixed position.

Receiver 102 may be a moving receiver array that includes a plurality of elements such that each element is configured to receive a scattered signal. Further, receiver 102 is configured to receive a set of information relating to the independent signals of each of the first plurality of elements. The radar functions of the disclosed embodiments may be performed using information received by any receiver with suitable receive equipment and knowledge of the transmitter waveform codes. Receiver 102 may be in motion, and not at a fixed position. Further, there may be a plurality of receivers, with all the receivers in motion. The receivers may not be coupled together, or in communication, so as to act independently of each other. For example, each receiver may be on moving vehicles within a certain area of emphasis. The receivers within the area may receive the transmitted signals continuously from the transmitters, such as transmitter 110.

Processing unit 104 is configured to receive information from receiver 102 and to determine target 150 location based on the scattered signals and the set of information relating to the independent signals of each of the first plurality of elements. Processing unit 104, along with receiver 102, may be an adaptive array used in conjunction with a set of antennae coupled to receiving system 100 to provide a versatile form of spatial filtering. Processing unit 104 may combine spatial samples of a propagating field with signals 140 with a variable set of weights. The weights may be chosen to reject interfering signals and noise. Specifically, the spatial filtering capability of the array may facilitate cancellation of hostile jamming signals and suppression of clutter.

Processing unit 104 may reformulate each of the independent signals provided by receiver 102. Accordingly, each processing unit 104 may form independently all potential beams generated by transmitter 110, or any subset of beams generated by transmitter 110. Because processing unit 104 does not control transmitter 110, a single transmitter may be utilized by multiple receiver/processing unit combinations. Thus, signals from a single transmitter may be recreated at each receiver, independently of the transmitter and the other receivers.

Processing unit 104 may be located physically with receiver 102 such that one processing unit is co-located or integral with each receiver. Alternatively, other arrangements may be possible, such as remotely locating processing unit 104 from receiver 102.

According to the disclosed embodiments, radar system 10 may provide the mechanism to obtain radar parameters, such as ground moving target indication ("GMTI"), air moving target indication ("AMTI"), and synthetic aperture radar ("SAR") imaging by forming simultaneous transmitter and receiver beams. The gain and directivity of each of the simultaneous transmitter and receiver beams may be comparable to known systems, such as phased array radar and bistatic radar technology. Using radar system 10, the transmitter and receiver beamforming may be controlled by a user within the field of view of the transmitter, provided the user has knowledge of the radar waveform codes. Thus, radar functions may be provided on-demand over wide geographical areas. The radar transmitter may be shared by multiple users over a wide geographical area without the need for specific requirements to task the source of illumination. For example, referring to FIG. 1, transmitter 110 and receiver 102 are not coupled to each so as to exchange data.

The transmitter and receiver beams may be formed and adapted after the radar signals have been digitized by receiver 102 within receiving system 100. For AMTI and GMTI functions, displaced phase center aperture ("DCPA") and space-time adaptive processing ("STAP") algorithms may be applied to transmitter and receiver degrees of freedom. STAP algorithms may help mitigate interference and clutter problems within receiving system 100. The availability of degrees of freedom that are physically located at the transmitter may be used to motion compensate independently the transmitter and receiver in air and space based systems. As a result, clutter may be suppressed in an airborne or space based system with as few as four degrees of freedom. The distribution of degrees of freedom between the transmitter and receiver may be used to extend other clutter suppression techniques, such as doppler nulling, from monostatic and bistatic systems. Doppler nulling may be defined as eliminating spatially and spectrally concentrated noise. For SAR functions, users may form single transmitter beams that remain focused on a user-specified center for spotlight imaging. Alternatively, transmitter beams may be formed to support scan mode imaging.

STAP performance may be dependent on scattered interference, available degrees of freedom, available processing power, and cost. STAP operations may take advantage of all the information available to radar system 10 to cancel interference adaptively. A STAP enabled radar system 10 may be able to dynamically respond to changes in the interference environment. Independent channels in space or time may be referred to as degrees of freedom. A STAP enabled system collects information from the independent channels and may use the information to compute the optimum weighting to accomplish the goal. STAP processing may minimize, or cancel, clutter and jamming while preserving the target signal in a desired direction. A reduction of minimum detectable velocity may be possible using STAP.

The primary degrees of freedom are in space and time. Spatial degrees of freedom are provided by the outputs of the array elements of radar system 10. Time degrees of freedom are formed by delayed replicas of the outputs from the array elements, or time taps. Other potential STAP degrees of freedom may include beam outputs and Doppler filter outputs (for post-Doppler or Beamspace STAP). Processing requirements are also an important factor in the cost of STAP. Too many adaptive degrees of freedom may overwhelm typical radar system signal processors. Transmitter degrees of freedom also may depend on the number of elements, or sub-apertures, associated with the transmitter array.

Thus, the disclosed embodiments may use "noise-like" waveforms for radar to extend the coverage area. Further, the disclosed embodiments may distribute spatially the radar degrees of freedom to obtain an increased level of clutter and interference suppression. Alternatively, the disclosed embodiments may enable clutter suppression with a smaller number of degrees of freedom than known systems. Clutter and interference suppression may be achieved by using orthogonal and pseudo-orthogonal transmitted waveforms to provide a dual transmit and receive aperture adaptivity. This feature may enable a reduction in the required sensor system degrees of freedom.

According to the disclosed embodiments, an adaptive broadcast radar system is disclosed that reduces the degrees of freedom within the system and enables the spatial distribution of degrees of freedom between a transmitter and a receiver. For example, the disclosed embodiments may be used to suppress clutter in an airborne or space-based system with as few as four degrees of freedom. Similarly, these degrees of freedom may be distributed spatially between the transmitter and the receiver according to the prevailing circumstances. A more robust transmitter may be implemented in conjunction with a less robust set of receivers. This configuration may be desired for those systems adapted to a surveillance environment.

Radar system 10 may share transmitter resources among a wide variety of users such that a prior tasking or the control of transmitter resources is not critical. Additional processing, intelligence, or tasking is avoided at the transmitter, other than operations to code independent waveforms. Radar functions may be performed against objects, or targets, anywhere within the field-of-view of the independently coded sub-arrays within the transmitter. Where coding occurs at the element level, the radar functions may be performed against objects anywhere in the forward hemisphere of the transmitter array by any user with suitable receiving equipment and knowledge of the transmitter waveform codes. The transmitted signal waveforms may be reconstructed at the receeiver, thus, possibly eliminating the need for a directed transmitted beam.

The transmitter waveforms are regenerated at the receiver and each user may form all potential beams independently, or any subset of potential transmitter beams. Thus, the transmitter waveforms are recreated at the receiver without being coupled directly to the transmitter. The transmitter beam pattern may be adapted by a user for purposes that include spotlight or scan mode SAR imaging, and interference/clutter suppression. Adaptive processing may include motion compensation of the transmitter. When combined with the motion compensation of the receiver, adaptive processing may provide bistatic displaced phase center aperture ("DPCA") clutter suppression.

The transmitter antenna phase centers may be added to the degrees of freedom for STAP algorithms. Data for STAP processing is organized into 3-dimensional arrays, where the 3-dimensional index identifies the transmitter/receiver array element number, the relative delay and doppler associated with a batch or coherent processing interval of data, and the time associated with the batch or coherent processing interval of data. The three-dimensional array may be known as data cubes. The inclusion of additional degrees of freedom associated with the transmitter array transforms a data cube into a new data structure termed a data quad. The STAP formulation enables a large class of emerging STAP techniques and algorithms to be developed for monostatic radars to be directly reformulated for bistatic radar systems, such as radar system 10.

Figure 2:
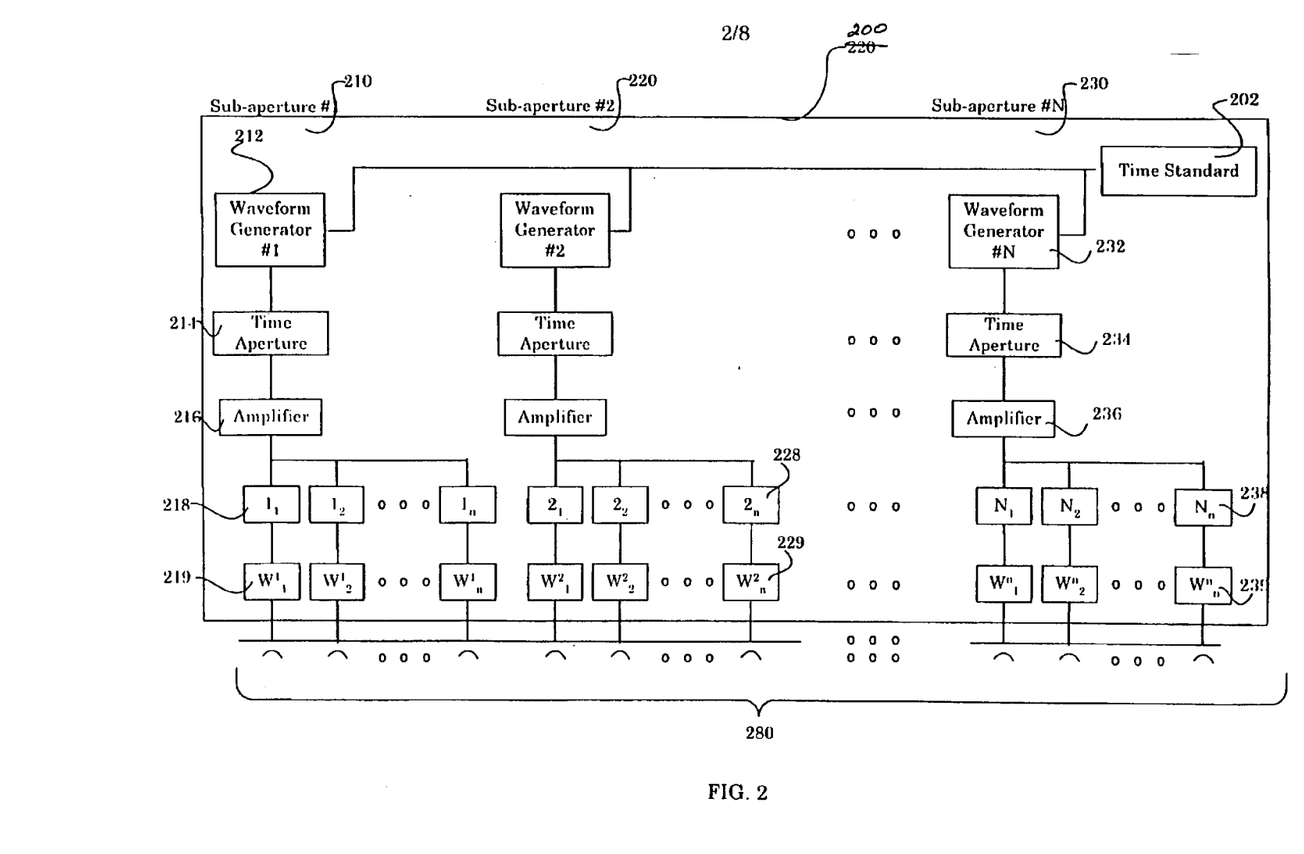
FIG. 2 illustrates a transmitter within an adaptive broadcast radar system in accordance with an embodiment of the present invention.

FIG. 2 depicts a block diagram of a transmitter for an adaptive broadcast radar system in accordance with an embodiment of the present invention. Transmitter 200 may be used in the adaptive broadcast radar system disclosed above. Transmitter 200 includes sub-apertures 210, 220, and 230. Transmitter 200 may have N number of sub-apertures, and is not limited to the number disclosed with reference to FIG. 2. Sub-apertures 210, 220, and 230 include waveform generators 212, 222, and 232, respectively. Waveform generators 212, 222, and 232 produce independent pseudo-random phase samples. Clock 202 is coupled to wave form generators 212, 222, and 232.

In addition to waveform generator 212, sub-aperture 210 includes time aperture 214 and amplifier 216. Sub-aperture 210 also includes phase shifters 218 and sub-aperture weights 219. In addition to waveform generator 222, sub-aperture 220 includes time aperture 224 and amplifier 226. Sub-aperture 220 also includes phase shifters 228 and sub-aperture weights 229. In addition to waveform generator 232, sub-aperture 230 includes time aperture 234 and amplifier 236. Sub-aperture 232 also includes phase shifters 238 and sub-aperture weights 239. Sub-aperture 230 may be the Nth aperture within transmitter 200.

Transmitter 200 preferably is a phased array antenna with multiple phase centers, and with independent signals transmitted on each element, or sub-aperture, of the array. The set of transmitted signals may be selected to orthogonal or pseudo-orthogonal. Orthogonal or pseudo-orthogonal signals may be generated using waveform coding, such as Gold codes. The signal spectrum may be shared between transmit elements, or sub-apertures, using code division multiple access ("CDMA"). Alternatively, the transmit signals may be assigned to independent frequency channels, and the spectrum shared using frequency division multiple access ("FDMA"). FDMA approaches also may include guard bands within the signal spectrum to accommodate anticipated doppler shifted clutter and targets. Thus, near orthogonality may be completed. Polarization state also may be used to define orthogonal transmit channels.

Thus, sub-aperture 210 tasks waveform generator 212 to generate a waveform from independent pseudo-random phase samples. The waveform is passed to time aperture 214. Time apertures may create a train of pulses that are coded differently for each sub-aperture. Alternatively, time aperture 214 may be bypassed to provide continuous wave ("CW") coded signals. For example, pseudo-random phase coding may occur where the length of the sequence exceeds the expected coherent correlation intervals. The waveform or train of pulses is received by amplifier 216 and passed to a bank of phase shifters 218 and sub-aperture weights 219. Phase shifters 218 and sub-aperture weights 219 may be set independently for each sub-aperture. Phase shifters 218 and sub-aperture weights 219 may be designed to generate a fixed beam in a direction relative to the boresight of transmitter 200. Further, the waveform is coded with the information to generate the data quads at the receiver, as disclosed in greater detail below. The waveform may be forwarded to antennas 280 for transmission. Sub-apertures 220 and 230 may operate in a similar manner, such that different waveforms are transmitted by antennas 280.

The formation of sub-apertures allows the number of degrees of freedom to be limited, and, thus, reduce system complexity. A corresponding reduction in coverage may occur where the coverage area is defined by the sub-aperture beam patterns. An alternative approach to reduce system complexity may involve operations at lower frequencies. The use of lower frequencies may reduce the number of transmitter elements desired for full coverage in the forward hemisphere of transmitter 200.

Figure 3:
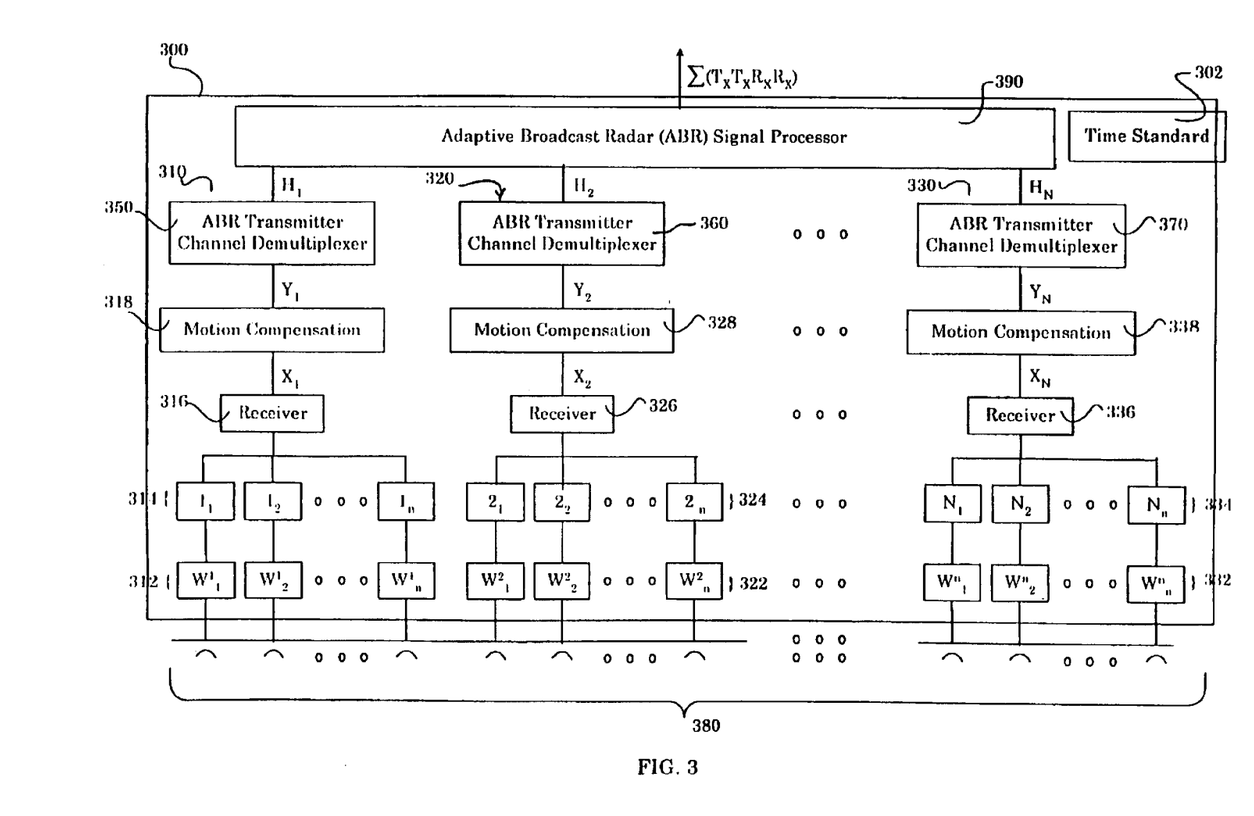
FIG. 3 illustrates a receiver within an adaptive broadcast radar system in accordance with an embodiment of the present invention.

FIG. 3 depicts a block diagram of a receiver for an adaptive broadcast radar in accordance with an embodiment of the present invention. Receiver 300 may receive transmitted signals directly or indirectly from transmitter 200 with antennas 380. Receiver 300 includes a clock 302 and sub-apertures 310, 320, and 330. Receiver 300 may have N number of sub-apertures, and is not limited to the number disclosed with reference to FIG. 3. Like transmitter 200, receiver 300 employs banks of phase shifters and sub-aperture weights within sub-apertures 310, 320, and 330 to modify the received signals from antennas 380. The formation of the sub-apertures may limit the number of degrees of freedom to reduce system complexity.

Sub-apertures 310, 320, and 330 also include receivers 316, 326, and 336, respectively. Receivers 316, 326, and 336 may be low-noise, high dynamic range receivers. In receivers 316, 326 and 336, sub-aperture formation may be used to reduce cost and complexity of the radar system if the adaptive broadcast radar transmitter, such as transmitter 200, is utilized for surveillance or reconnaissance in a restricted area. To support operations that desire wide area coverage, the radar system may operate at a lower frequency to reduce system complexity without a corresponding reduction in coverage. Receivers 316, 326, and 336 are coupled to adaptive broadcast radar transmitter channel demultiplexers 350, 360, and 370, respectively. Preferably, each demultiplexer is dedicated to each respective sub-aperture.

The sampled output of the $k^{th}$ sub-aperture in the receiver system may be denoted $V_{Rx}(k, t_n)$. Motion compensation functions 318, 328, and 338 may remove time dependent phase delays between the transmitter and receiver system. Motion compensation may be performed for each receiver sub-aperture independently. Because the received signal is a composite of transmitted signals, a single point on the transmitter, such as transmitter 200, may be motion compensated. The transmitter may be known as the $j_0^{th}$ transmitter sub-aperture. To simplify the derivations, a scaling also may be included in motion compensation functions 318, 328, and 338. The scale factor may be the inverse of the transmitted signal strength. The signal strength may be proportional to the square-root of the transmitter power delivered to the $j_0^{th}$ transmitter sub-aperture. The motion compensated signal may be given by:

$$X_k(t) \equiv \frac{V_{RX}(k,t)}{V_{Tx}(t)} e^{-2\pi i f(t-\tau(\overline{X}_{Tx:j0}(t) - \overline{X}_{RX:k}(t)))}$$

where f is the center frequency of the transmitted signal, and, $\tau(\overline{X}_{Tx:j0}(t) - \overline{X}_{Rx:k}(t))$ is the signal propagation delay from the $j_0^{th}$ transmitter sub-aperture to the $k^{th}$ receiver sub-aperture. For example, transmitter sub-aperture 210 may send a signal to receiver sub-aperture 310 that is motion compensated. The above algorithm discloses the motion compensation operation performed by motion compensation function 318.

Receiver 300 also includes signal processor 390. Signal processor 390 may be coupled to the sub-apertures of receiver 300, such as sub-apertures 310, 320, and 330. Signal processor 390 may correlate to processing unit 104 depicted in FIG. 1. Signal processor 390 forms the data quads for STAP operations within the adaptive broadcast radar system. Signal processor 390 is disclosed in greater detail below. Using the respective demultiplexers and signal processor 390, the transmitted signal waveform may be regenerated from the information encoded onto the waveform at transmitter 200. Receiver 300, as disclosed in greater detail below, is capable of recreating the transmit signal beam from the numerical data encoded on the waveform, such as degrees of freedom of transmitter 200 without being directly coupled to transmitter 200.

Figure 4:
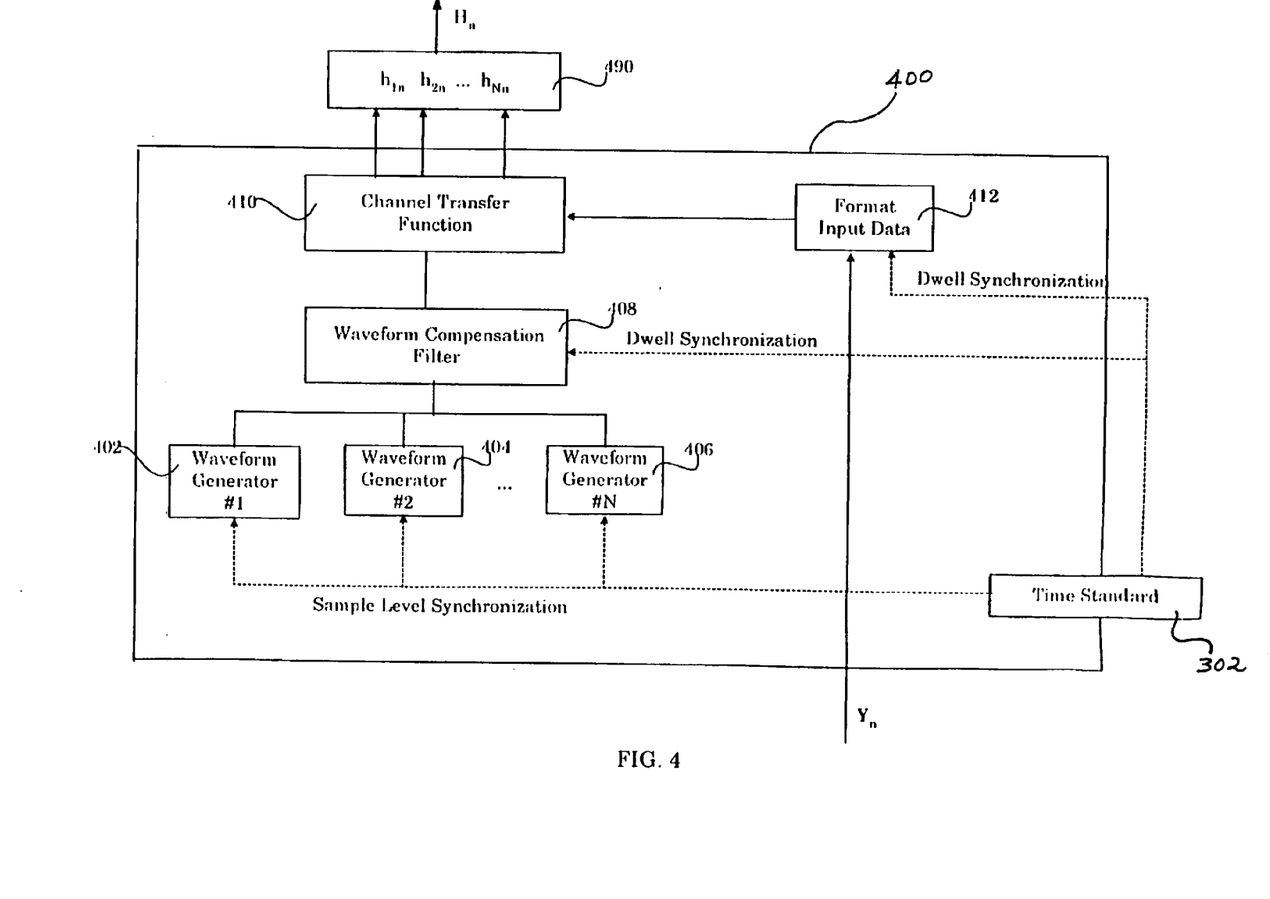
FIG. 4 illustrates a channel demultiplexer in accordance with an embodiment of the present invention.

FIG. 4 depicts a block diagram of an adaptive broadcast radar channel demultiplexer in accordance with an embodiment of the present invention. Demultiplexer 400 correlates to demultiplexers 350, 360, and 370 depicted in FIG. 3. Demultiplexers 350, 360, and 370, however, are not limited to the embodiments disclosed by FIG. 4. Demultiplexer 400 includes a bank of waveform generators 402, 404, and 406. Waveform generators 402, 404, and 406 are time-synchronized with the transmitter, such as transmitter 200, and may generate replicas of each of the N transmitted signals, where N is the number of transmitter sub-apertures. Thus, demultiplexer 400 may have N waveform generators correlating to N sub-apertures of transmitter 200. Waveform generators 402, 404, and 406 are coupled to clock 302.

Waveform compensation may be initialized and/or updated once per coherent processing interval. The coherent processing interval is chosen such that the number of signal samples is greater than or equal to J, or the number of transmitter sub-apertures, times M, or the number of delay values desired to cover the ground clutter grid. A waveform compensation filter computation function 408 may generate and format an $N_t \times (J \cdot M)$ array of delayed reference signals, where $N_t$ may be the number of samples in a coherent processing interval. The reference signal data, $s_j(t_n - \tau_m)$, associated with the $m^{th}$ delay for the $j^{th}$ transmitter sub-aperture is mapped into the $q^{th}$ column, where $q(j,\mu) = \mu + (j-1) \cdot M$. The inverse map of the generalized index, q, into the sub-aperture index, j, and the delay index, $\mu$, may be given by:

$$\mu \equiv \mathrm{mod}(q, M)$$

$$j \equiv \mathrm{floor}\left(\frac{q}{M}\right)$$

For the coherent processing interval starting with the time sample $t_{n0}$, the array of delay-compensated reference data may be given by:

$$\Sigma_{n,q}(n_0) \equiv s_{j(q)}(t_n - \tau_{\mu(q)})$$

where $n \in [n_0, n_0 - N_t - 1]$ and $q \in [1, J \cdot M - 1]$

The term also may be written in terms of $\tilde{S}_{j,n} \equiv S_j(t_n)$. Because $t_n - \tau_{\mu(q)} = t_{n-\mu(q)}$ and $S_j(t_n - \tau_\mu) = \tilde{S}_{j,n-m}$, the array of delay-compensated reference may be given by:

$$\sum(n_0) \equiv \begin{pmatrix} \tilde{S}_{0,n_0} & \tilde{S}_{0,n_0-1} & \cdots & \tilde{S}_{0,n_0-M+1} & | & \tilde{S}_{1,n_0} & \tilde{S}_{1,n_0-1} & \cdots & \tilde{S}_{0,n_0-M+1} & |\cdots| & \tilde{S}_{j-1,n_0} & \tilde{S}_{j-1,n_0-1} & \cdots & \tilde{S}_{j-1,n_0-M+1} \\ \tilde{S}_{0,n_0-1} & \tilde{S}_{0,n_0-2} & \cdots & \tilde{S}_{0,n_0-M} & | & \tilde{S}_{1,n_0-1} & \tilde{S}_{1,n_0} & \cdots & \tilde{S}_{0,n_0-M} & |\cdots| & \tilde{S}_{j-1,n_0-1} & \tilde{S}_{j-1,n_0} & \cdots & \tilde{S}_{j-1,n_0-M} \\ \cdots & \cdots & \cdots & \cdots & | & \cdots & \cdots & \cdots & \cdots & |\cdots| & \cdots & \cdots & \cdots & \cdots \\ \tilde{S}_{0,n_0+Nt-1} & \tilde{S}_{0,n_0+Nt-2} & \cdots & \tilde{S}_{0,n_0+Nt-M} & | & \tilde{S}_{1,n_0+Nt-1} & \tilde{S}_{1,n_0+Nt-2} & \cdots & \tilde{S}_{0,n_0+Nt-M} & |\cdots| & \tilde{S}_{j-1,n_0+Nt-1} & \tilde{S}_{j-1,n_0+Nt-2} & \cdots & \tilde{S}_{j-1,n_0+Nt-M} \end{pmatrix}$$

If $N_t$ is selected such that $N_t = J \cdot M$, summation $\Sigma$ may be a square matrix, and, for pseudo-random phase code signals, it may be shown to be invertible. Accordingly, waveform compensation filter computation function 408 may be $\Sigma^{-1}$. Thus, when $N_t > J \cdot M$, the pseudo-inverse may be used and waveform compensation filter 408 may be given by:

$$(\Sigma^{*T}\Sigma)^{-1}\Sigma^{*T}$$

The output of waveform compensation filter 408, also known as the channel transfer function, is given by $H = W^T Y$.

When the channel transfer functions H include both delayed and doppler-shifted signal components, summation $\Sigma$ may be replaced by an array of reference signals that are compensated for both delay, $\tau_\mu$, and doppler shift, $f_\nu$. A generalized index q defines the column for data associated with the $j^{th}$ sub-aperture, the $\mu^{th}$ delay and $\nu^{th}$ doppler and $$q(j,\mu,\nu) \equiv \nu + [\mu + (j-1) \cdot M] \cdot N$$

The inverse map, of the generalized index, q, into the sub-aperture index, j, and delay index, $\mu$, may be given $$\nu \equiv \mathrm{mod}(q-1, N) + 1$$

$$\mu \equiv \mathrm{mod}\left(\mathrm{floor}\left(\frac{q-1}{N}\right), N\right) + 1$$

$$j \equiv \mathrm{floor}\left(\frac{q-1}{M \cdot N}\right) + 1$$

Then, the array of compensated reference signals may be given by:

$$\sum\nolimits_{n,q}(n_0) \equiv e^{2\pi i f v(1)(m-\tau_{\mu(q)})} S_{j(q)} \left( m - \tau_{\mu(q)} - \frac{\lambda f_{v(q)}}{c_{light}}(t_n - \tau_{\mu(q)}) \right)$$

where $n \in [n_0, n_0+N_r-1]$ and $q \in [1, J \cdot M \cdot N-1]$.

For the $k^{th}$ receiver system sub-aperture, H is a vector of length $J \cdot M \cdot N$. Vector H may be reformatted into a $J \times (M \times N)$ array where the $j^{th}$ element discloses the dependence of the channel transfer function on transmitter sub-array degrees of freedom and $(\mu, v)$ discloses the delay and doppler dependence.

Thus, according to the disclosed embodiments, demultiplexer 400 receives the motion compensated signals $Y_n$ at input data format function 412. Input data format function 412 also receives synchronization data from clock 302. Waveform generators 402, 404, and 406 also are synchronized by clock 302 to generate replicas of the transmitted signals. These replica signals are passed to waveform compensation filter function 408, also synchronized with clock 302. Waveform compensation filter function 408 outputs compensated reference signals to channel transfer function 410, which outputs channel transfer functions 490.

Channel transfer functions 490 contain delay, doppler, and other information about the received signal data. Channel transfer functions 490 may be specific to received signal data from each sub-aperture of receiver 300.

Figure 5:
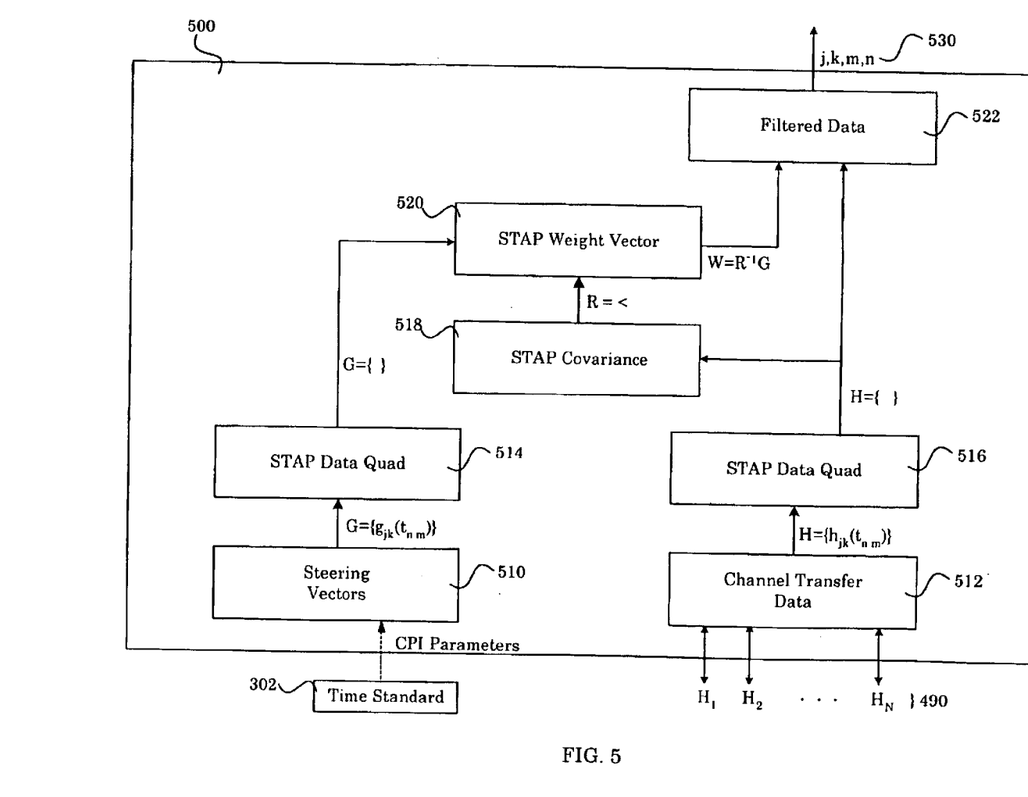
FIG. 5 illustrates a signal processor in accordance with an embodiment of the present invention.

FIG. 5 depicts a block diagram of a signal processor in accordance with an embodiment of the present invention. Signal processor 500 enables the formation of data quads for STAP applications. Because of the simultaneous transmitter and receiver beams, the steering vector, G, is a quad that discloses the desired sensor response for both transmitter 200 and receiver 300. STAP may be a framework rather than a specific algorithm. The definition of the steering vector and the definition of the approach to modeling and estimating the measurement covariance are desired to transform the STAP framework into a specific algorithm.

The STAP covariance may be modeled as a diagonal matrix, independently of delay and time to provide simultaneous fixed transmitter and receiver beamforming. Weight vectors are proportional to the steering vector and provide the amplitude and phase adjustments desired to steer the transmitter and receiver beams in a particular direction. Diverse types of fully adaptive and partially adaptive STAP algorithms designed to adapt both transmitter and receiver antenna patterns may be specified in terms of the weight vectors. For example, bistatic DPCA may be implemented using steering vector components defined by:

$$G = \left\{ \begin{array}{c} g_j \otimes g_k \\ -2g_j \otimes g_k \\ g_j \otimes g_k \end{array} \right\}$$

Thus, signal processor 500 may operate as follows. Channel transfer functions 490 are received from demultiplexer 400 at channel transfer data function 512. Channel transfer data function 512 formats the channel transfer functions 490 into channel transfer components, or $H = \{h_{j,k}(t_{n\ m})\}$. Steering vector computation function 510 receives coherent processing interval parameters from clock 302 and computes steering vector components, or $G = \{g_{j,k}(t_{n\ m})\}$. STAP data quad reformat functions 516 and 514 then reformat the channel transfer components and steering vector components, respectively.

STAP covariance function 518 receives the channel transfer component H and computes, or estimates, a measurement covariance. The STAP covariance may be depicted as a diagonal matrix, and independent of delay and time to provide simultaneous fixed transmitter and receiver beamforming. STAP weight vector function 520 receives the measurement covariance and the steering vector component, G, to compute the weight vector, or $W = R^{-1}G$. Weight vectors may be proportional to the steering vector, G. Weight vectors may provide the amplitude and phase adjustments desired to steer the transmitter and receiver beams in a particular direction. This feature allows diverse types of fully adaptive and partially adaptive STAP algorithms for both transmitter and receiver antenna patterns to be specified in terms of the weight vectors.

The weight vectors are received at filtered data function 522, along with channel transfer components, or H. The channel data within the channel transfer components may be reformatted and the data quads computed by applying the weight vectors to the channel transfer components. Thus, data quad 530 is output to other system components for further processing. Data quad 530 may be defined in four-dimensions by indices determined by filtered data function 522.

Figure 6:
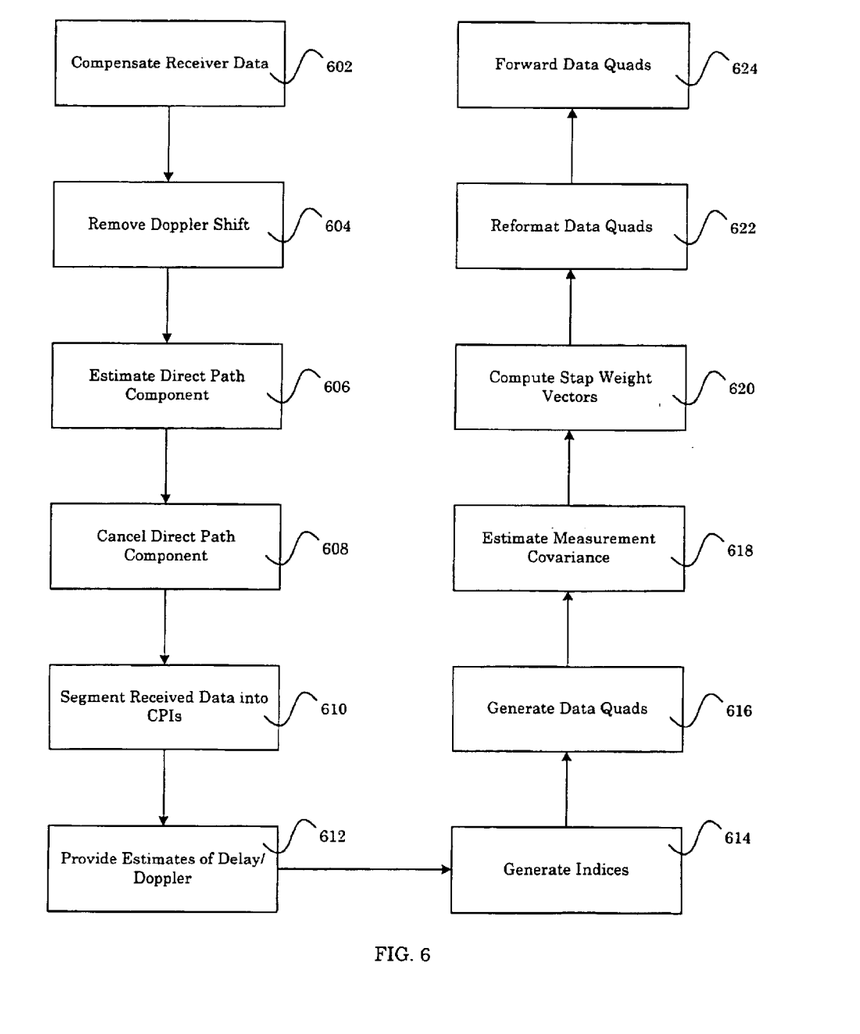
FIG. 6 illustrates a flowchart for formatting received data in accordance with an embodiment of the present invention.

FIG. 6 depicts a flowchart for formatting data within the received signal in accordance with an embodiment of the present invention. The data is formated to form the data quads disclosed above. The signal may be received at receiver 300, and the following disclosed operations may be executed within receiver 300, demultiplexer 400, and signal processor 500. Step 602 executes by compensating the receiver data from the signal. Specifically, the receiver data is motion compensated by processing the data associated with each element, or sub-aperture, of the receive array of receiver 300. Step 604 executes by removing the doppler shift from the receiver data. Step 604 may be executed in conjunction with step 602. The doppler shift may exist due to the relative motion of receiver 300 and transmitter 200. The doppler shift removal may be given by $$X_k(t) = X_{0_k}(t) e^{-2\pi i f T_x - R_x t}$$

Step 606 executes by estimating the direct path component, or transmitter signal, of the received signal. The total transmitted signal may be modeled parametrically and the model parameters estimated. The transmitter signal may be modeled on an element-by-element basis and the model may include parameters to describe the bearing of receiver 300 relative to the boresight of transmitter 200, and the magnitude of the transmitted signal power at the element of receiver 300. Model parameters may be estimated using known adaptive techniques to minimize received power. Step 608 executes by cancelling the direct path component, or transmitter signal from the received signal. Specifically, estimates of the direct path signal, as disclosed above, may be subtracted from the received data, given by $$Y_k(t) = X_k(t) - a_k \sum_{j=1}^{j} \left\{ e^{2\pi i (j-1-\frac{j-1}{2})\delta_L sin(\varphi_k)} \right\} S_j$$

Step 610 executes by segmenting the received data into the coherent processing intervals. Coherent processing intervals also may be known as "dwells." Step 612 executes by providing estimates of delay or delay/doppler of the scattered signal components from the segmented data. The segmented data is coherently processed to provide the estimates. The estimates may be given by $$((\chi_n)_m)_{j,k} = \int_{T_n} \bar{S}_j(t-\tau_m) Y_k(t) \, dt$$

$$((\chi_n)_{,v})_{j,k} = \int_{T_n} \bar{S}_j(t-\tau_m) e^{-2\pi i(v-1)\delta f_{dop}} Y_k(t) \, dt$$

Step 614 executes by generating indices for the estimates determined above. The indices, j and k, may define the appropriate transmitter and receiver element numbers, respectively. The indexing scheme is general enough to accommodate two-dimensional arrays. Further, in the case of the second estimate equation disclosed above the independent delay and doppler indices may be combined into a single index, or m'=m+$M_\tau$ (n-1), where $M_\tau$ is the total number of delay measurements in the measurement domain.

Step 616 executes by generating the data quads according the indices. The indices, (j, k, m, n) may define points in the four-dimensional data quads. Standard index mapping may be used to transform the dimensional data vector into a one-dimensional vector, $x_{\mu'}$. Step 618 executes by estimating the measurement covariance, R, for the vector disclosed above. Standard STAP techniques may be applied to estimate the measurement covariance, or $R_{m'} = (X_p * X_{m'})$. Step 620 executes by computing the STAP weight vectors. STAP weight vectors, W, may be computed in terms of the covariance and the steering vector, G, or W=$R^{-1}$G. As disclosed with reference to FIG. 5, the weight vectors provide the amplitude and phase adjustments desired to steer beams in a particular direction.

Step 622 executes by reformatting the data quad, and its information, with the weight vector. The data quad includes information on the transmitter/receiver element number, the delay and/or doppler associated with the batch of data for the coherent processing interval, the time for the coherent processing interval, and the degrees of freedom. The information in the data quad describes the transmitted signal such that it may be regenerated by receiver 300. Step 624 executes by forwarding the data quad information to additional processing components.

The following examples may be applied to bistatic radar. First, an extension of DPCA may be considered. The extension may be designed to provide adaptation in the transmit and receive arrays.

The equation Let $$g_{Tx} = \left\{ e^{2\pi i \left(k - \frac{K+1}{2}\right) \delta \sin(\varphi_{Tx})} \right\}$$

may represent the transmit aperture weights designed to provide a fixed beam in direction, $\varphi_{Tx}$, relative to the boresight of transmitter 200. In addition, the equation let $$g_{Rx} = \left\{ e^{2\pi i \left(k - \frac{K+1}{2}\right) \delta \sin(\varphi_{Rx})} \right\}$$

may define the desired weights for the receive system as depicted with reference to FIG. 3. G may be formed as follows:

$$G = \left\{ \begin{array}{c} g_{Tx} \otimes g_{Rx} \\ -2 g_{Tx} \otimes g_{Rx} \\ g_{Tx} \otimes g_{Rx} \end{array} \right\}.$$

G may correspond to a three-pulse DPCA. Second, G may be defined as the steering vector for a target doppler, $f_d$, or $$G = \left\{ \begin{array}{c} g_{Tx} \otimes g_{Rx} e^{-2\pi i f_d T} \\ -g_{Tx} \otimes g_{Rx} \\ g_{Tx} \otimes g_{Rx} e^{2\pi i f_d T} \end{array} \right\}$$

Figure 7:
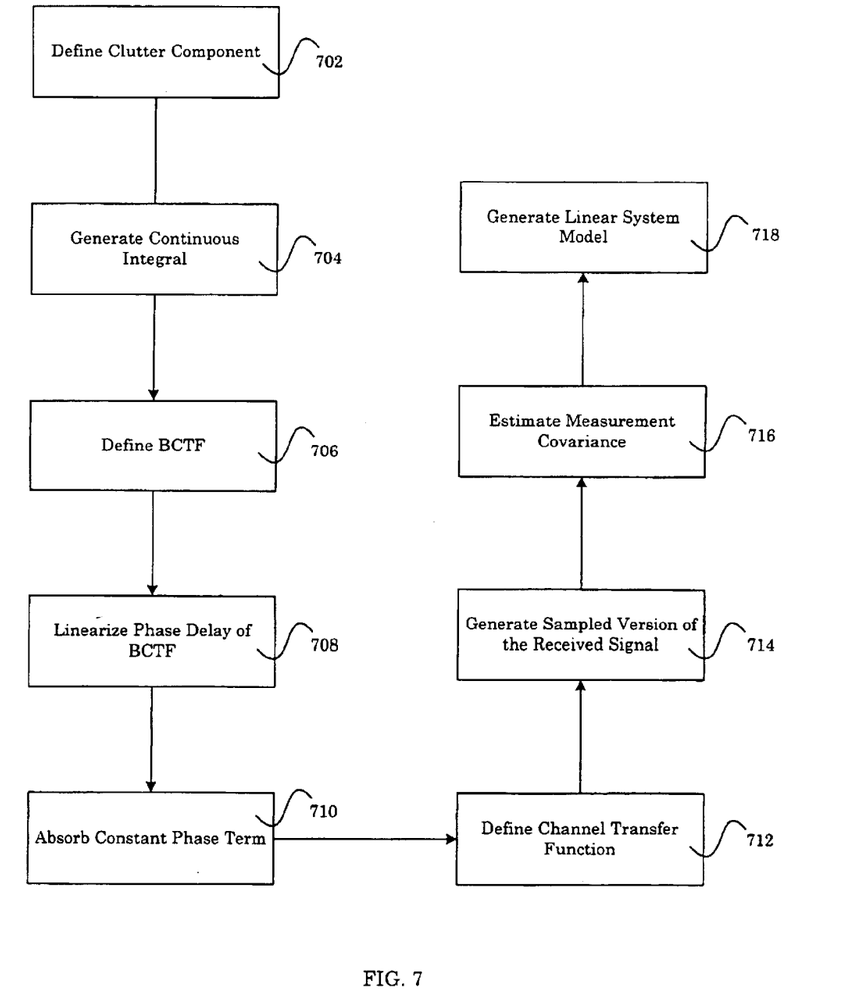
FIG. 7 illustrates a flowchart for generating a sensor signal model in accordance with an embodiment of the present invention.

FIG. 7 depicts a flowchart for generating a sensor signal model in accordance with an embodiment of the present invention. A sensor signal model may facilitate removing the pseudo-random baseband modulation from the received signal. The sensor signal model may disclose the received signal in terms of the clutter and target environemnt, and is desired to interpret effectively the sensor output. Step 702 executes by defining a clutter component for the sensor signal model. According to the disclosed embodiments, $$X_p(k,t) = \sum_{j=0}^{J-1} \left\{ A_{0;j,k}(\bar{x}_c, \bar{x}_{Tx}, \bar{x}_{Rx}) e^{i\psi_{jk}(t)} + \int_{A_{clutter}} A_{c;j,k}(\bar{x}_c, \bar{x}_{Tx}, \bar{x}_{Rx}) e^{-i\phi_{c;jk}(\bar{x}_c,t)} e^{i\psi_{jk}(t-\Delta\tau_{c;jk}(\bar{x}_c,t))} d^2 \bar{x}_c \right\} + v(t)$$

where $\Phi^j$ is the phase of the baseband signal transmitted though the jth sub-aperture. $\Psi^j_k$ may be equal to a delayed version of $\Phi^j$ where the delay may be about equal to the direct path delay from the reference transmitter sub-aperture, $j_0$, to the kth receiver sub-aperture, or $$\Psi_k(t) = \Phi^j(t - \tau(\bar{x}_{Tx;j_0}(t) - \bar{x}_{Rx;k}(t)))$$

$\Delta\tau_{c;jk}(x_c,t)$ may be the delay from transmitter 200 to clutter patch to receiver 300 relative to the direct path delay as disclosed above. In particular, the delay may be given by $$\Delta\tau_{c;jk}(x_c,t) = \tau(R_{jc}(t)) + \tau(R_{ck}(t)) - \tau(R_{0;j_0k}(t))$$

$\phi_{c;jk}(x_c,t)$ may be the delay from transmitter 200 to clutter patch to receiver 300 relative to the direct path phase delay. The RF phase delay may be given by $$\phi_{c;jk}(\bar{x}_c, t) = 2\pi f_0 \Delta\tau_{c;jk}(\bar{x}_c, t)$$

$A_{0;j,k}$ may be the relative strength of the direct path signal relative to the transmitted signal strength. $G_{Tx;jk}$ may denote the sub-aperture gain of the $j^{th}$ transmitter sub-aperture in the direction of the $k^{th}$ receiver sub-aperture. $G_{Rx;jk}$ may denote the sub-aperture gain of the $k^{th}$ receiver sub-aperture in the direction of the $j^{th}$ transmitter sub-aperture. L may denote the path loss for the direct path signal component. The relative strength of the direct path signal relative to the transmitted signal strength may be given by $$A_{0;j,k}(\bar{x}_{Tx}, \bar{x}_{Rx}) = \lfloor G_{Tx;jk} G_{Rx;jk} L(R_{0;jk}) \rfloor$$

$A_{c;j,k}$ may be the relative strength of the scattered signal where $\bar{x}_c$ may denote the location of the clutter patch, $\hat{e}_{jc}$ and $\hat{e}_{kc}$ may be unit vectors that point from transmitter 200 to the clutter patch and from the clutter patch to receiver 300. $\sigma^0(\bar{x}_c | \hat{e}_{jc}, \hat{e}_{ck})$ may be the relative bistatic reflectivity of the ground patch at $\bar{x}_c$. Thus, the relative strength of the scattered signal may be given by $$A_{c;j,k}(\bar{x}_c, \bar{x}_{Tx}, \bar{x}_{Rx}) = \lfloor G_{Tx}(\hat{e}_{jc}) G_{Rx}(\hat{e}_{ck}) L(R_{jc}) L(R_{ck}) \sigma^0(\bar{x}_c | \hat{e}_{jc}, \hat{e}_{ck}) \rfloor$$

In addition v(t) may denote the noise process.

Step 704 executes by generating integral of the received signal. The received signal may be re-expressed in terms of a continuous integral over the delay measurement, τ, or $$X_p(k,t) = \sum_{j=0}^{J-1}\left\{H_{0;j,k}(t)V_{jk}(t) + \int_{\Delta\tau}H_{c;j,k}(\tau',t)V_{jk}(t-\tau')d\tau'\right\} + v(t)$$

where $V_{jk}(t) \equiv e^{i\psi^j k(t)}$.

Step 706 executes by defining the bistatic channel transfer function ("BCTF"). $H_{c;j,k}(\tau,t)$ may be termed the BCTF and may be given by an integral over a constant delay strip, or $$H_{c;j,k}(\tau,t) \equiv \int_{[\Delta\tau_c(\bar{x}_c)=\tau]} e^{-i\varphi_{c;jk}(\bar{x}_c,t)}A_{c;j,k}(\bar{x}_c,\bar{x}_{Tx},\bar{x}_{Rx})d^2\bar{x}_c$$

Step 708 executes by linearizing the phase delay of the BCTF. Linearization of the phase delay in the BCTF may demonstrate the dependence on doppler and the bearing of transmitter 200 and receiver 300 to the clutter patch, or $$D_p = \begin{bmatrix} d_{Tx}[\sin(\phi_{Tx\_c}) + \sin(\phi_{Tx\_Rx})] \\ d_{Rx}[\sin(\phi_{c\_Rx} + \eta_{Rx}) - \sin(\phi_{Tx\_Rx} + \eta_{Rx})] \\ V_{Tx}[\sin(\phi_{Tx\_c}) + \sin(\phi_{Tx\_Rx})]\delta t_{nyquist} + V_{Rx}[\sin(\phi_{c\_Rx}) - \sin(\phi_{Tx\_Rx})]\delta t_{nyquist} \end{bmatrix}$$

Step 710 executes by absorbing the constant phase term into the relative strength of the scattered signal, or $A_{c;j,k}$. Thus, the BTCF may be given by $$H_{c;j,k}(\tau,t) \equiv \int_{[\Delta\tau_c(\bar{x}_c)=\tau]} e^{-i\bar{k}^T\cdot D_p}A_{c;j,k}(\bar{x}_c,\bar{x}_{Tx},\bar{x}_{Rx})d^2\bar{x}_c.$$

Step 712 executes by defining the channel transfer function. The signal may be sampled at the in-time at the Nyquist rate and in delay at a rate consistent with the delay resolution, δτ. Step 714 executes by generating a sampled version of the received signal. The sampled version of the received signal may be a function of the channel transfer function, or given by $$X_p(k,n) = \sum_{j=0}^{J-1}\sum_{m=0}^{M-1} H_{c;j,k}(m\delta\tau)V_{jk}(n\delta t_{nyquist} - m\delta\tau)\delta\tau + v_{k,n}.$$

Step 716 executes by revising the signal model. The focus of this step is on associating with the $k_0^{th}$ receiver sub-aperture. Using simplified notation and dropping the indices associated with the sub-aperture of receiver 300 and the coherent processing interval, the signal model may be rewritten to $$Y_n = \sum_{j=0}^{J-1}\sum_{m=0}^{M-1} H_{j,m}S_{j,n-m} + v_n$$

where $Y_n \equiv X_p(k,n)$ $H_{j,m} \equiv H_{c;j,k}(m\delta\tau)\delta\tau$ $S_{j,n} \equiv V_{jk}(n\delta t_{nyquist})$ Thus, the signal model for a batch of data associated with the $k_0^{th}$ receiver sub-aperture and the time sample $n=n_0$ may be given by $Y = \{X_{k_0,n}\}_{n\in[n_0,n_0+N-1]}$ Step 718 executes by generating a linear system model for the signal model. The linear system model may be expressed as $$\begin{pmatrix} Y(0) \\ Y(1) \\ \dots \\ Y(N-1) \end{pmatrix} = \Sigma^o \begin{pmatrix} H_{0,0} \\ H_{0,1} \\ \dots \\ H_{0,M-1} \\ H_{1,0} \\ H_{1,1} \\ \dots \\ H_{1,M-1} \\ \dots \\ \overline{H_{J-1,0}} \\ H_{J-1,1} \\ \dots \\ H_{J-1,M-1} \end{pmatrix} + \begin{pmatrix} v(0) \\ v(1) \\ \dots \\ v(N-1) \end{pmatrix}$$

The general lest squares solution may be give by $\tilde{H}=(\Sigma^T\Sigma)^{-1}\Sigma^T Y$ where $P\equiv\Sigma^T Y$ where $P\equiv\Sigma^T Y$ represents application of a generalized matched filter to received data and $R\equiv(\Sigma^T\Sigma)$ is a whitening, or waveform compensation filter, such as waveform compensation filter 408. When $N_t=J\cdot M\cdot N$, $\Sigma$ may be invertible and, thus, $H=\Sigma^{-1}Y$.

The disclosed process may remove the pseudo-random baseband modulation from the received signal. The channel transfer function may still have RF phase delay information encoded within. The phased delay information may be related to the direction of the clutter patch relative to the specific transmitter and receiver sub-apertures. The application of the steering vectors to the channel transfer functions may separate out the linear phase delays associated with specific directions from transmitter 200 and receiver 300. Application of transmitter aperture weights to the BCTF compensates for the linear phase term in the BCTF model. This action may provide a technique to resolve scattering sources in the delay and the angle of the received signal.

Figure 8:
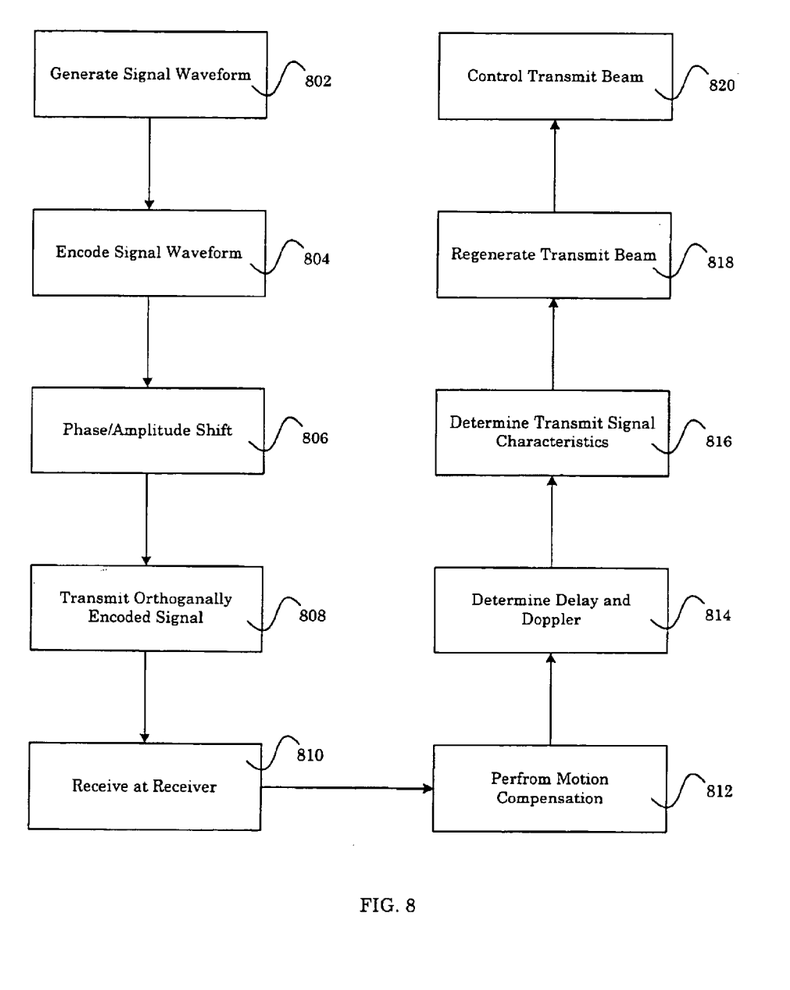
FIG. 8 illustrates a flowchart for performing radar operations within an adaptive broadcast radar system in accordance with an embodiment of the present invention.

FIG. 8 depicts a flowchart for performing radar operations within an adaptive broadcast radar system in accordance with an embodiment of the present invention. FIG. 8 depicts the processes disclosed above, with reference to overall adaptive broadcast radar system. Within the system, a signal waveform is transmitted continuously from a transmitter over an area that may have a number of receivers. The receiver may receive signals from the transmitter and scattered signals reflected off a target within the area.

Step 802 executes by generating a signal waveform within the transmitter, such as transmitter 200. The signal waveform may be generated within a sub-aperture of transmitter 200. Preferably, each sub-aperture of transmitter 200 may generate a signal in a pseudo-random manner. Step 804 executes by encoding the signal waveform with numerical information. Specifically, the signal waveform is encoded orthogonally. By being encoded orthogonally, the signals from the different sub-apertures may be distinguishable. Further, the degrees of freedom associated with transmitter 200 also may be encoded into the signals. Step 806 executes by placing phase shifts and amplitude, or weights, onto the signal. The phase shifters and weights may be set independently for each sub-aperture of transmitter 200.

Step 808 executes by transmitting the orthogonally encoded signal in a continuous manner over an area. Preferably, the area may be forward of transmitter 200. The signals may be directed towards the area with the purpose of reaching receivers within the area. Further, transmitter 200 transmits from an array antenna coupled to the sub-apertures. Transmitter 200 may be in motion, such as an airplane pointing transmitter 200 below itself to receivers on the ground. Step 810 executes by receiving the direct and scattered signals at receiver 300. The received signal may be a composite of the transmitted signals, and may have data for the transmitted signals. Receiver 300 also may have an array antenna coupled to sub-apertures that correlate to the sub-apertures on transmitter 200. The signals received are digitally reconstructed to determine target parameters from the direct path signals and scattered signals.

Step 812 executes by performing motion compensation to remove time dependent phase delays between transmitter 200 and receiver 300. Motion compensation may be performed independently for each sub-aperture of receiver 300. Step 814 executes by determining the delay and doppler, if applicable, for the received signal. This information may be placed into a channel transfer function. Once the motion compensation and delay/doppler steps are complete, Step 816 executes by determining the remaining characteristics of the transmit signal.

Step 818 executes by regenerating the transmit signal from transmitter 200. By using the information encoded in the transmitted signal waveforms, such as degrees of freedom and the transmit sub-aperture or element number, and the information derived from the signal, such as delay and doppler, the transmit beam may be recontructed. Although the transmitted signal was not "beamed" to a specific location, receiver 300 may use the parameters identified above to "reconstruct" a beam transmitted at the target. The reconstructed beam may be used for additional radar operations, such as target tracking. Step 820 executes by controlling the regenerated transmit beam at receiver 300 for tracking the target detected from the scattered signals.

It will be apparent to those skilled in the art that various modifications and variations can be made in the disclosed embodiments of the present invention without departing from the spirit or scope of the invention. Thus, it is intended that the present invention embodies the modifications and variations of this invention provided that they come within the scope of the appended claims and their equivalents.

What is claimed is:

1. A method for generating a sensor signal model for a received signal within an adaptive broadcast radar system, comprising:
   - defining a clutter component for said received signal at a receiver, wherein said clutter component comprises a direct path signal and a scattered signal;
   - defining a channel transfer function;
   - generating a sampled version of said received signal according to said channel transfer function at a sample time;
   - determining a batch of data from said sampled version for a sub-aperture of said receiver at said sample time; and
   - indexing said batch of data into said sensor signal model.

2. The method of claim 1, wherein said sensor signal model is a linear system model.

3. The method of claim 1, wherein said batch of data includes a delay.

4. The method of claim 1, further comprising linearizing a phase delay within said channel transfer function to determine a doppler shift component for said received signal.

5. The method of claim 4, further comprising absorbing said phase delay into said channel transfer function.

6. The method of claim 4, wherein said phase delay correlates to a direction of clutter relative to said receiver.

7. An adaptive broadcast radar system, comprising:
   - a transmitter comprising a first plurality of sub-apertures, wherein each sub-aperture comprises a bank of phase shifters and sub-aperture weights to generate a fixed beam and codes a signal waveform with data about the transmitter, said data including degrees including degrees of freedom; and
   - a receiver comprising a second plurality of sub-apertures coupled to a signal processor, wherein each sub-aperture comprises a bank of phase shifters and sub-aperture weights to modify the signal waveform received from the transmitter and wherein said signal processor generates a transmit beam signal according to said data within each signal waveform.

* * * * *